United States Patent
Segev et al.

(10) Patent No.: US 12,039,198 B2
(45) Date of Patent: Jul. 16, 2024

(54) DYNAMIC WRITE SHAPING

(71) Applicant: Western Digital Technologies, Inc., San Jose, CA (US)

(72) Inventors: Amir Segev, Meiter (IL); Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 85 days.

(21) Appl. No.: 17/750,058

(22) Filed: May 20, 2022

(65) Prior Publication Data

US 2023/0376244 A1 Nov. 23, 2023

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,600,205 B1 | 3/2017 | Nowell et al. | |
| 9,996,457 B2 | 6/2018 | Post et al. | |
| 10,509,590 B2 | 12/2019 | Choi et al. | |
| 11,017,847 B2 | 5/2021 | Tanpairoj et al. | |
| 11,169,709 B2* | 11/2021 | Richter | G06F 13/1642 |
| 2021/0223994 A1 | 7/2021 | Kanno et al. | |
| 2023/0134404 A1* | 5/2023 | Boenapalli | G06F 12/084 |
| | | | 711/118 |

* cited by examiner

*Primary Examiner* — Midys Rojas
(74) *Attorney, Agent, or Firm* — PATTERSON + SHERIDAN, LLP

(57) ABSTRACT

The present disclosure generally relates to an efficient manner of fetching data for write commands. The data can be fetched prior to classification, which is a fetch before mode. The data can alternatively be fetched after classification, which is a fetch after mode. When the data is fetched after classification, the write commands are aggregated until sufficient data associated with any command is split between memory devices. When in fetch before mode, the data should properly align such that data associated with any command is not split between memory devices. Efficiently toggling between the fetch before and fetch after modes will shape how writes are performed without impacting latency and bandwidth without significantly increasing write buffer memory size.

20 Claims, 8 Drawing Sheets

DYNAMIC WRITE SHAPING

BACKGROUND OF THE DISCLOSURE

Field of the Disclosure

Embodiments of the present disclosure generally relate to an efficient manner of fetching data for write commands.

Description of the Related Art

In nonvolatile memory express (NVMe) solid state drives (SSDs), the write command flow is typically automated. The automated flow fetches the data associated with the write command, classifies the data, and accumulates sufficient data to match the memory device page size. Such a flow is useful as the firmware (FW) can decided on the actual location of the data in the memory device even after the data is already present. The write memory buffer should hold enough pages of data to accommodate the FW address selection, the data transfer to the memory device, and the memory device program, all while still keeping the required bandwidth.

When a write command is initially received, the command is classified and checked to ensure the write command does not overlap with another command. Eventually, the write command is completed even though the data associated with the write command is not yet written to the memory device.

For stream write commands, the data associated with the stream write command, when read, will typically be read sequentially. Additionally, non-stream write commands might have different sizes. Non-stream write commands interspersed with stream write commands can lead to situations where data associated with the stream write commands do not fit the data storage size and thus needing to be split between multiple dies, which is not desirable.

Therefore, there is a need in the art for a better manner to write data to a data storage device to ensure efficient read operations.

SUMMARY OF THE DISCLOSURE

The present disclosure generally relates to an efficient manner of fetching data for write commands. The data can be fetched prior to classification, which is a fetch before mode. The data can alternatively be fetched after classification, which is a fetch after mode. When the data is fetched after classification, the write commands are aggregated until sufficient data associated with any command is split between memory devices. When in fetch before mode, the data should properly align such that data associated with any command is not split between memory devices. Efficiently toggling between the fetch before and fetch after modes will shape how writes are performed without impacting latency and bandwidth without significantly increasing write buffer memory size.

In one embodiment, a data storage device comprises: a memory device; and a controller coupled to the memory device, wherein the controller is configured to: determine whether the controller is in a fetch first mode or a fetch after mode; determine whether a fetch depth (FD) is less than a flash memory unit (FMU) count (FC); and switch between the fetch first mode and the fetch after mode based upon the determining whether FD is less than FC.

In another embodiment, a data storage device comprises: a memory device; and a controller coupled to the memory device, wherein the controller is configured to: determine that the controller is in a fetch first mode; send a write command to a write aggregation module; set fetch depth (FD) to be equal to FD minus command size; measure a new average turn-around time (TAT); calculate a new flash memory unit (FMU) count; and determine the fetch first mode should be changed to fetch after mode.

In another embodiment, a data storage device comprises: memory means; and a controller coupled to the memory means, wherein the controller is configured to: toggle between a fetch first mode and a fetch after mode based upon a relationship between fetch depth (FD) and flash management unit (FMU) count, wherein fetch first mode comprises fetching data up to a predetermined performance bandwidth and wherein fetch after mode comprises storing a write command in a pre-aggregation pool until sufficient commands associated with data are stored to meet the predetermined performance bandwidth.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to an efficient manner of fetching data for write commands. The data can be fetched prior to classification, which is a fetch before mode. The data can alternatively be fetched after classification, which is a fetch after mode. When the data is fetched after classification, the write commands are aggregated until sufficient data associated with any command is split between memory devices. When in fetch before mode, the data should properly align such that data associated with any command is not split between memory devices. Efficiently toggling between the fetch before and fetch after modes will shape how writes are performed without impacting latency and bandwidth without significantly increasing write buffer memory size.

Figure 1:
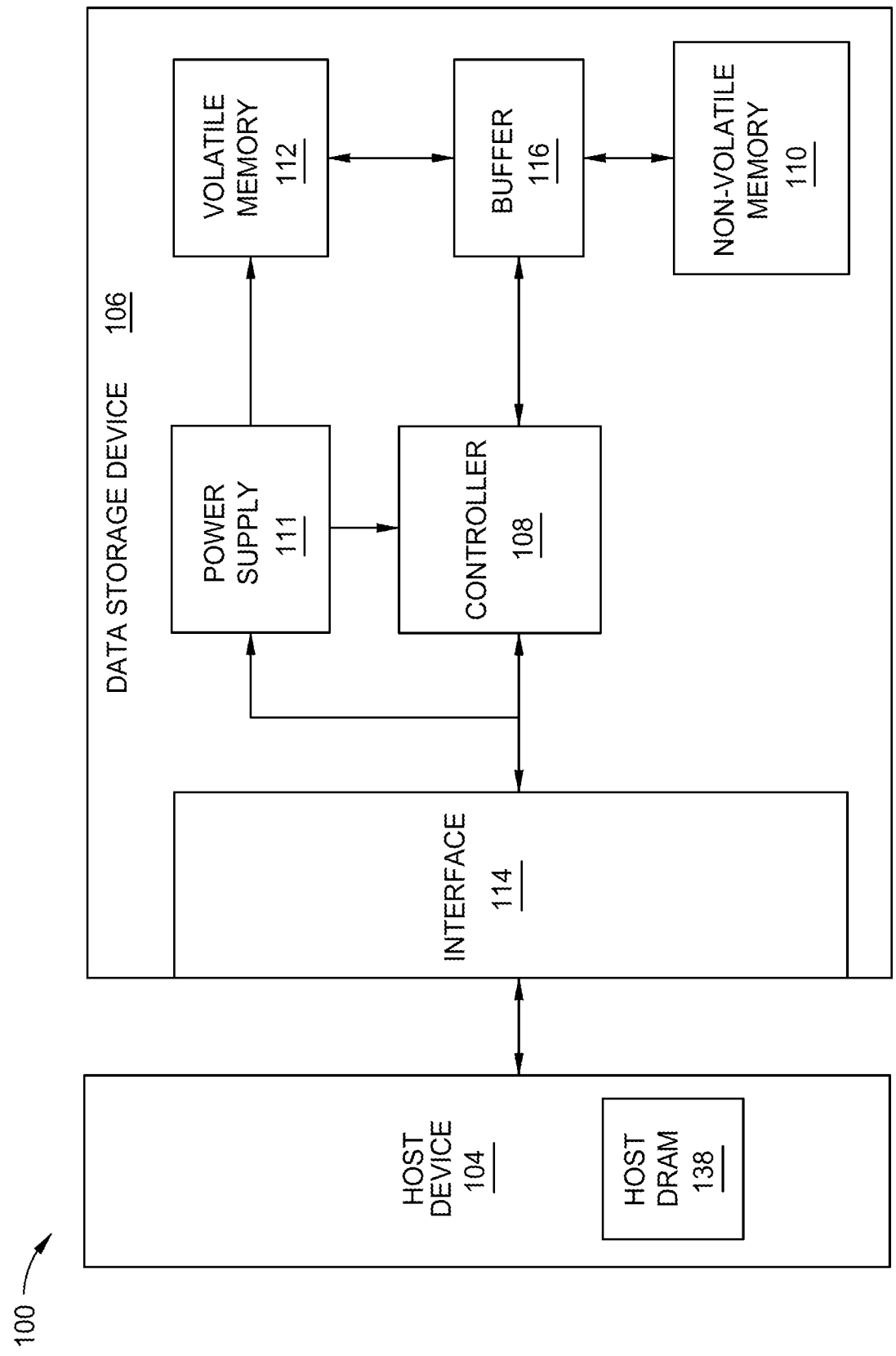
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
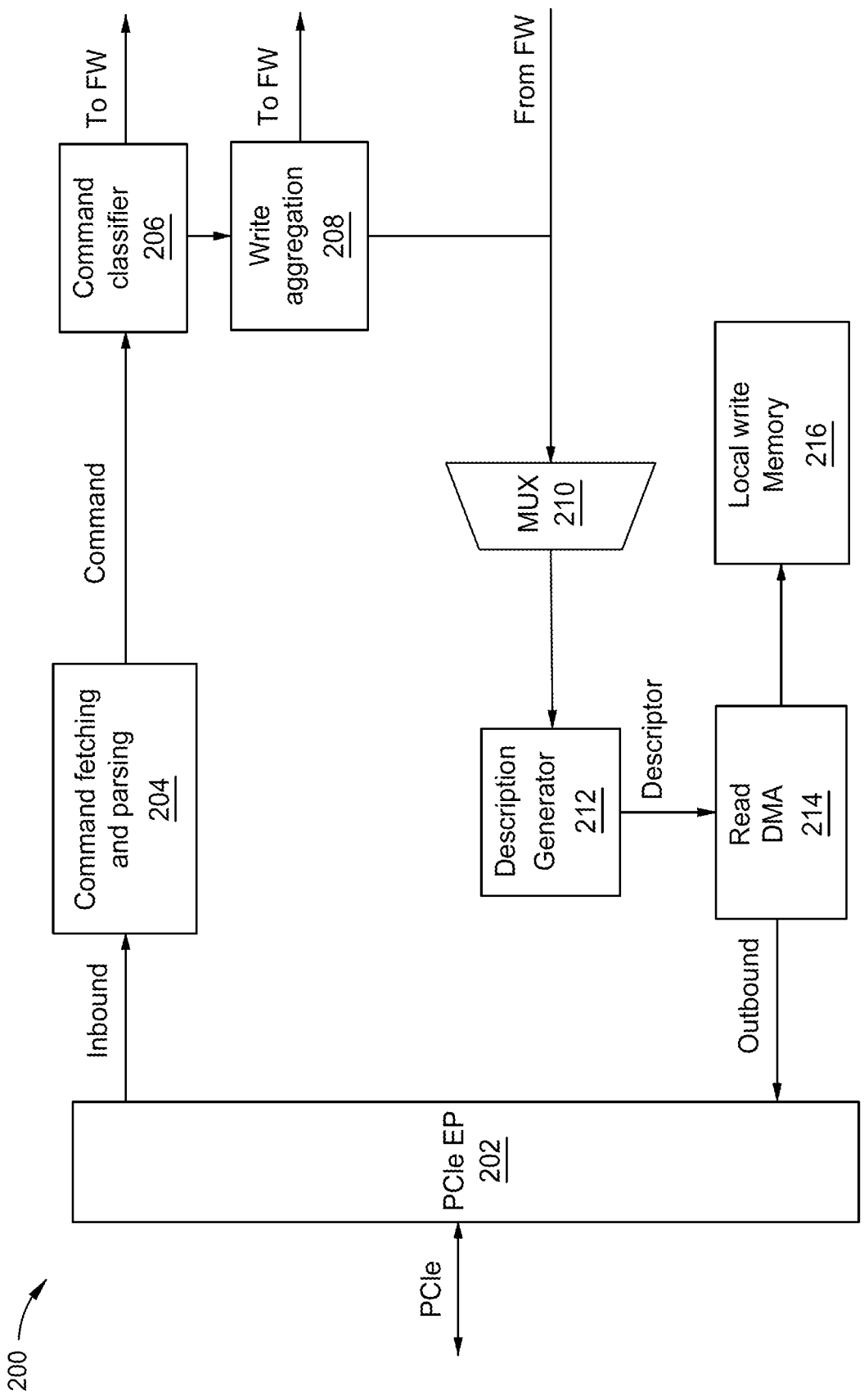
FIG. 2 is a schematic illustration of TLP packet handling.

FIG. 2 is a schematic illustration of TLP packet handling within the controller 108. Commands, including write commands and stream write commands, arrive or are fetched through the PCIe endpoint (EP) 202. The commands are then parsed in a parser 204 that may also direct the PCIe EP 202 to fetch the commands. The write commands are then sent to a command classifier 206 for classification. If any command is a read command, the read commands first need to have some address translation to be able to start transactions. Administrative commands require FW intervention. Write commands, on the other hand, can begin processing by fetching the data associated with the write commands. The write aggregation module 208 is responsible for bringing enough data from the host device to fill at least an entire memory device page (e.g., a NAND page) before the controller finally informs FW. The write aggregation module 208 does so by triggering the read DMA 214 through the MUX 210 and description generator 212. The write aggregation module 208 is also capable of further classifying different writes so that the writes are accumulated in different regions in the write memory. The descriptor generator 212 receives requires from FW or from the write aggregation module 208 and arbitrates between the requestors to then generate a DMA descriptor. The Read DMA 214 receives the descriptor and executes the read from the host device through the PCIe EP 202 to then locally write the data to memory 216. The local write memory 216 holds the data until a later point in time when the data is written to the NVM.

Figure 3:
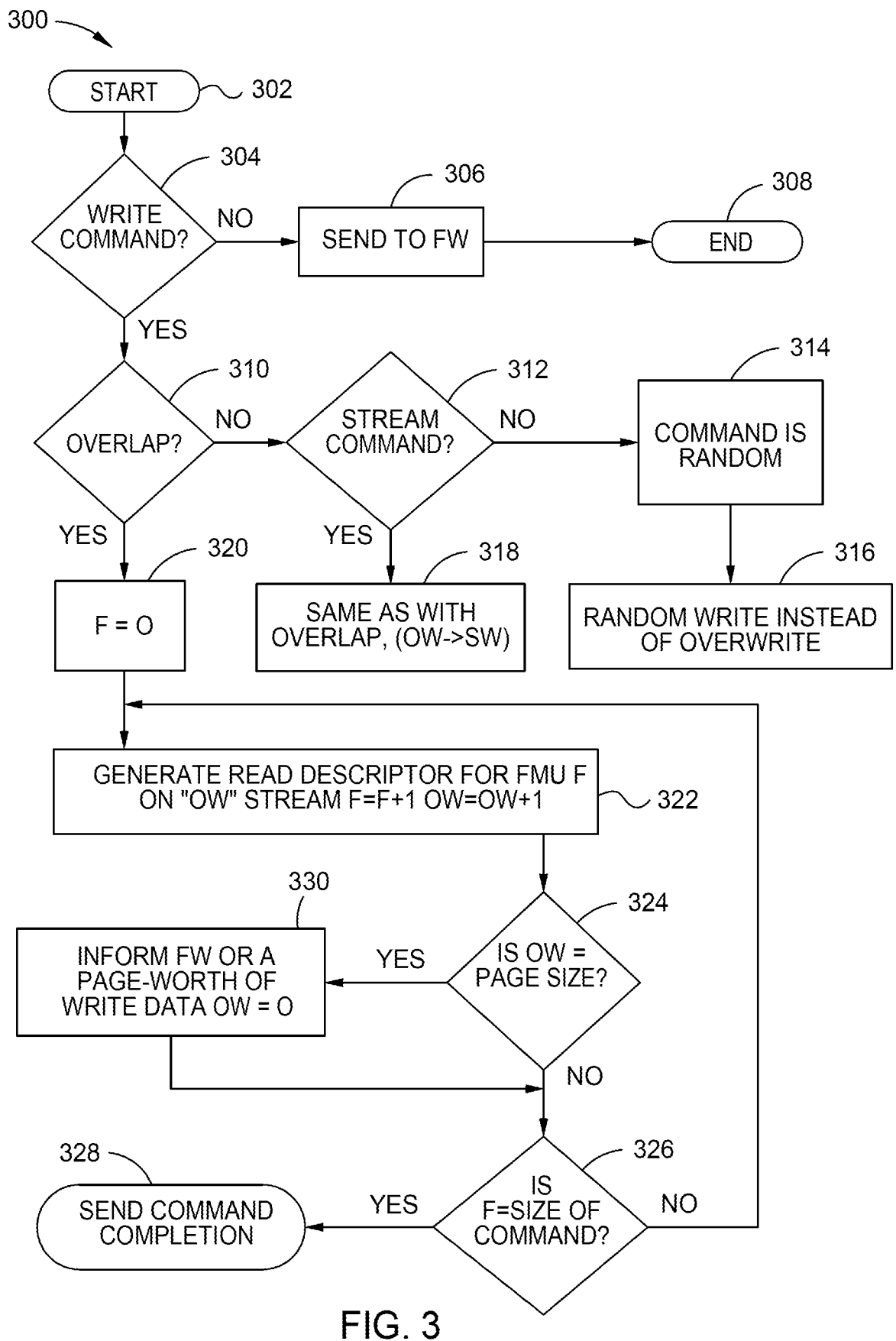
FIG. 3 is a flowchart illustrating a write command flow.

FIG. 3 is a flowchart 300 illustrating a write command flow. The write flow starts at 302 when the command arrives. A determination is made at 304 whether the command is a write command. If the command is not a write command, then the command is sent to FW at 306 and the write command flow ends at 308. If the command is a write command, then the write command is classified. A determination is made at 310 regarding whether the write command is an overlap write (OW) command. OW commands are special cases since the write commands that are overlapped should be treated differently due to the fact that the OW commands must be completed after that commands for which there is an overlap. If the command is an OW command, the HW starts generating read requests (per FMU) by initially setting F (i.e., the FMU) equal to 0 at 320 and generating read descriptors for FMU F on an OW stream. F is then set to F plus 1 and OW is set to OW plus 1 at 322. If the OW stream accumulated a page worth in size at 324 before (or just as) completing the command, the FW is provided with the data and OW is set to equal 0 so that the data can be written to the memory device at 330. A determination is then made at 326 regarding whether the size of the command is equal to F. If the size of the command does not equal F, then the method 300 refers back to 322, but if F equals the size of the command at 326, then the command completion message is sent at 328. The HW sends the completion to the host even though the command is not yet written to the memory device. As the data has not yet been written to the memory device, the local write memory 216 is needed for temporary storage. If the command is not an OW command, a determination is made at 312 regarding whether the command is a stream write command. Stream write commands also share a special property where the stream write command is typically, though not always, read sequentially. If the write command is not a stream write command at 312, then the command is classified by a different identifier, such as a ransom write command at 314 and then is written as a random write instead of a OW command at 316. If the command is a stream write command at 312, the stream write command is treated the same as an OW command at 318.

In other embodiments, the classification of write commands, or the aggregation size might be different (i.e., the aggregation size might depend upon the SLC/QLC properties). Alternatively, classification can consider a fully aligned command, both start address and size, to a different stream. The number of streams is limited, however, as the memory size for the local write memory 216 is also limited. Unfortunately, the data for the write commands utilize a large amount of memory, and the FW often needs to do re-classification after arrival of the data.

Figure 4:
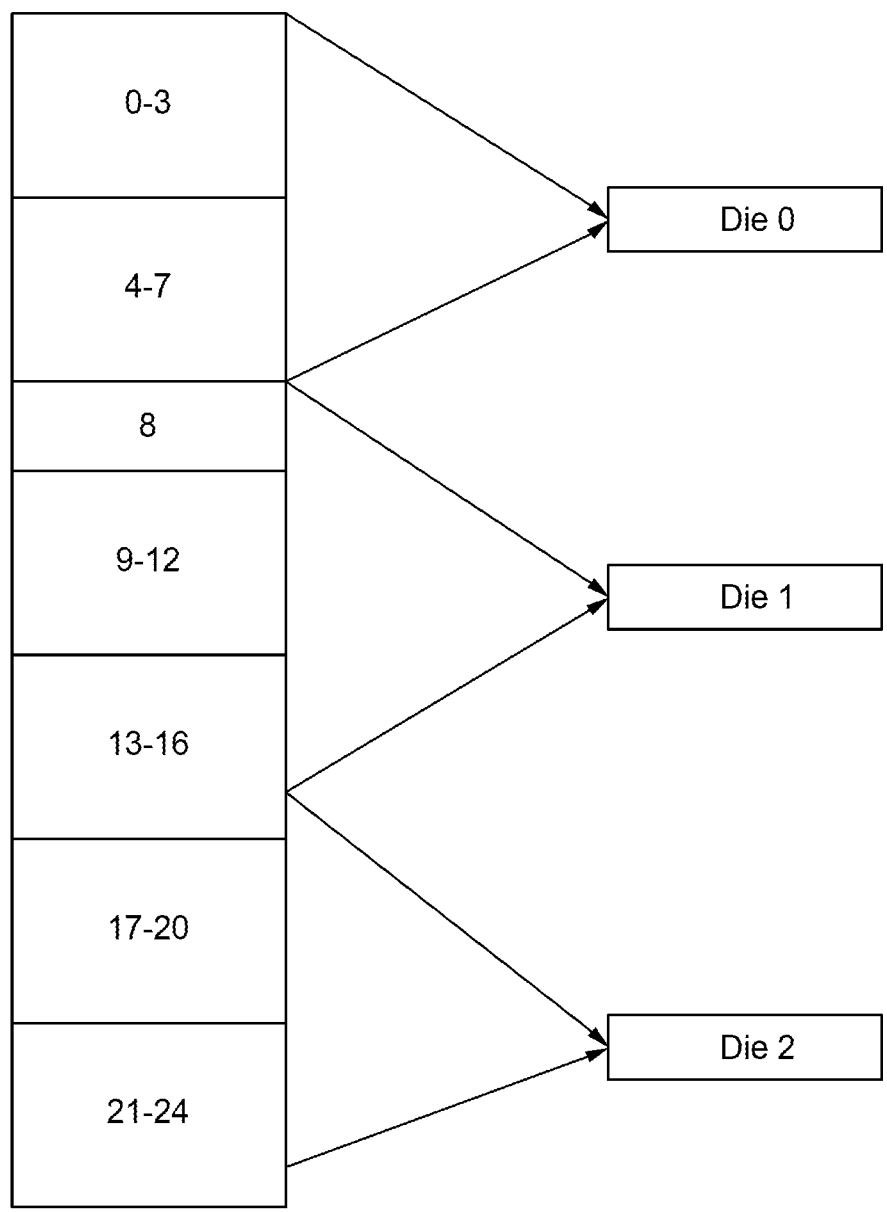
FIG. 4 is a schematic illustration of a hardware classification mis-alignment.

FIG. 4 is a schematic illustration of a hardware classification mis-alignment. In the example of FIG. 4, seven consecutive commands are present. The first command covers FMUs 0-3; the second command covers FMUs 4-7; the third command covers FMU 8; the fourth command covers FMUs 9-12; the fifth command covers FMUs 13-16; the sixth command covers FMUs 17-20; and the seventh command covers FMUs 21-24. Each page of the memory device has 8 FMU. As the commands are consecutive, the commands are directed to the stream region. However, the fifth command encompassing FMUs 13-16 is split between two different memory device dies as is the seventh command and likely other commands received thereafter. When a read occurs, a read of the data associated with the fifth command (or the seventh command) will involve reading from multiple dies.

For example, reading data associated with the first and second commands will involve reading only from Die 0. Reading data associated with the third command will involve reading only from Die 1. Reading data associated with command 4 will involve reading only from Die 1. Reading data associated with command 6 will involve reading only from Die 2. Reading data associated with command 5, however, will involve reading from Die 1 and Die 2 as FMUs 13-16 are split between Die 1 and Die 2. Reading data associated with command 7 will be similar to reading data associated with command 5. Hence, writing command 5 consecutively after command 4 creates issues for read command processing efficiency.

As will be discussed herein, the embodiments involve recognizing a mis-aligned write that will lead to inefficient read operations. The controller will aggregate data so that the data will properly align and then write the now properly aligned data to the memory device. The controller will make better accumulation decisions without impacting bandwidth or write latency. Analyzing the write commands after fetching the data, while effective, requires a large amount of memory to accumulate enough data before the smart analysis can be performed. Fetching the data after analysis on the commands will cause latency issues for the write commands and negatively impact quality of service (QoS) and bandwidth. The embodiments discussed herein adaptively decide when the fetch data before classification and when to provide the HW and FW with the opportunity to classify the commands before fetching the data.

Figure 5A:
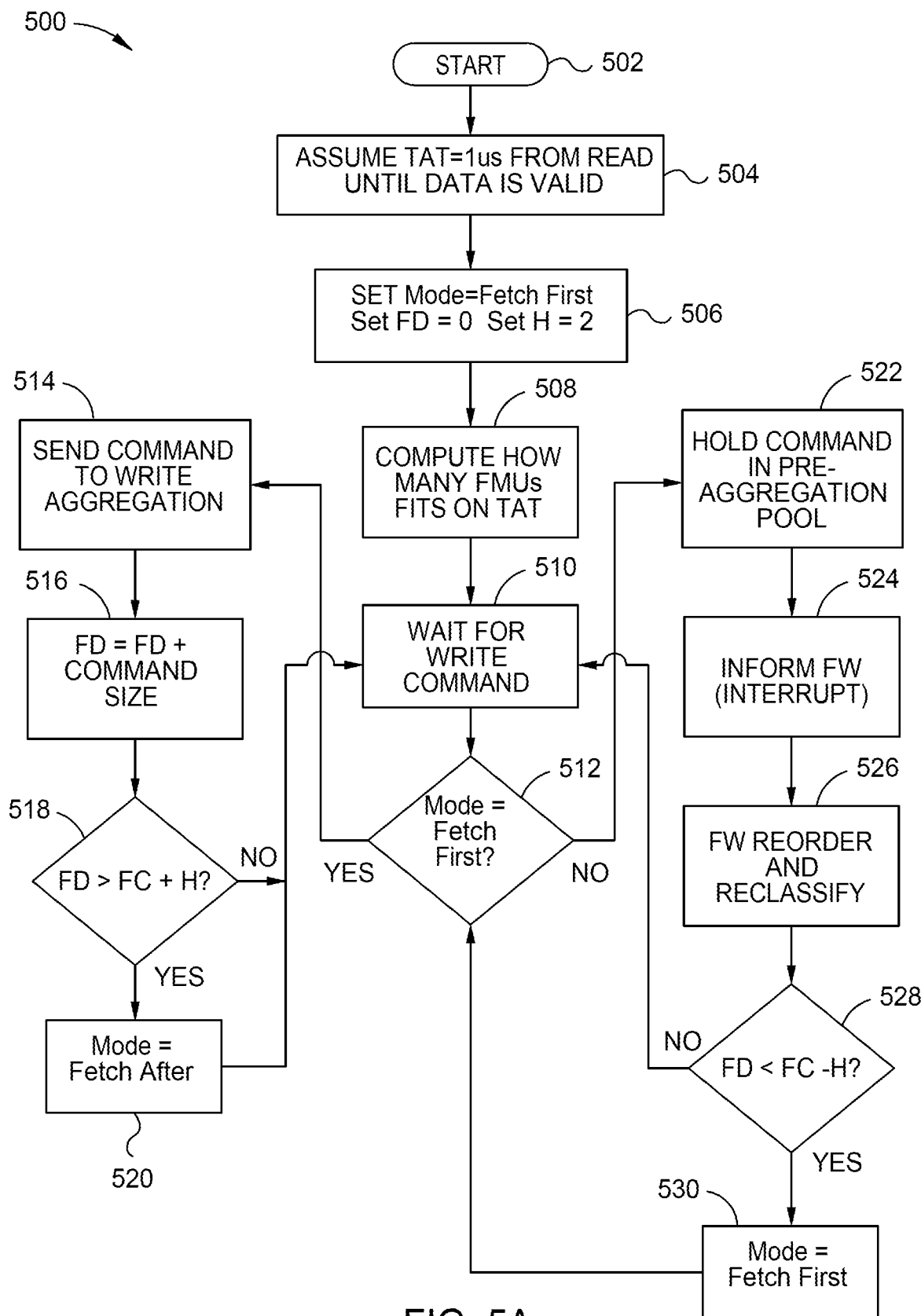
FIG. 5A is a flowchart illustrating toggling between fetch first and fetch after modes in a write command process.

FIG. 5A is a flowchart 500 illustrating toggling between fetch first and fetch after modes in a write command process. The process starts at 502 and enters an initialization phase. During the initialization phase, an assumption is made that the turn around time (TAT) is 1 μSec from reading the data until the data is valid at 504. The mode is initially set to fetch first, the fetch depth (FD) is set to 0, and the hysteresis (H) is set to 2 at 506. Based upon the link speed (LS), which may equal 32T GEN5×4 for example, the number of FMUs that fit the TAT is computed at 508 using the formula FMU count (FC) is equal to LS divided by TAT divided by 4K and then adding the result to 2 times H (e.g., FC=LS/TAT/4K+2H). In one embodiment FC equals 8 FMUs.

Once initialization has ended, the controller simply waits for a write command at 510. Once a write command is received, a determination is made at 512 regarding whether the mode is equal to fetch first.

If the mode is fetch first at 512, then there is a small number of FMUs that were already fetched due to FD<FC and the HW is allowed to fetch the data by activating the write aggregation block. The command is thus sent to the write aggregation block at 514 and the number of fetched FMUs is increased at 516. A determination is made at 518 whether more data has been fetched than the required queue depth to meet performance bandwidth plus some H overhead. If FD is greater than FC+H at 518, then the mode is changed to fetch after at 520 and the controller waits for the next write command at 510. If FD is not greater than FC+H at 518, then the mode remains in fetch first and the controller waits for the next write command at 510.

If the mode is not fetch first at 512, then the mode is fetch after, which means that there are plenty of previously fetched data and the command does not need to be pushed to the write aggregation module. Rather, the command is held in a pre-aggregation pool at 522. In the pre-aggregation pool, the command, and not the data, is stored. FW is then informed via interrupt at 524 of the arrival of the new command into the pool where the FW can reorder and reclassify the command at 526. If, during the loop, FD becomes smaller than FC minus H, at 528, the mode is switched to fetch first at 530 and the controller waits for the next write command at 510. As long as FD is not less than FC minus H at 528, the mode remains in fetch after and the controller waits for a new write command at 510.

Figure 5B:
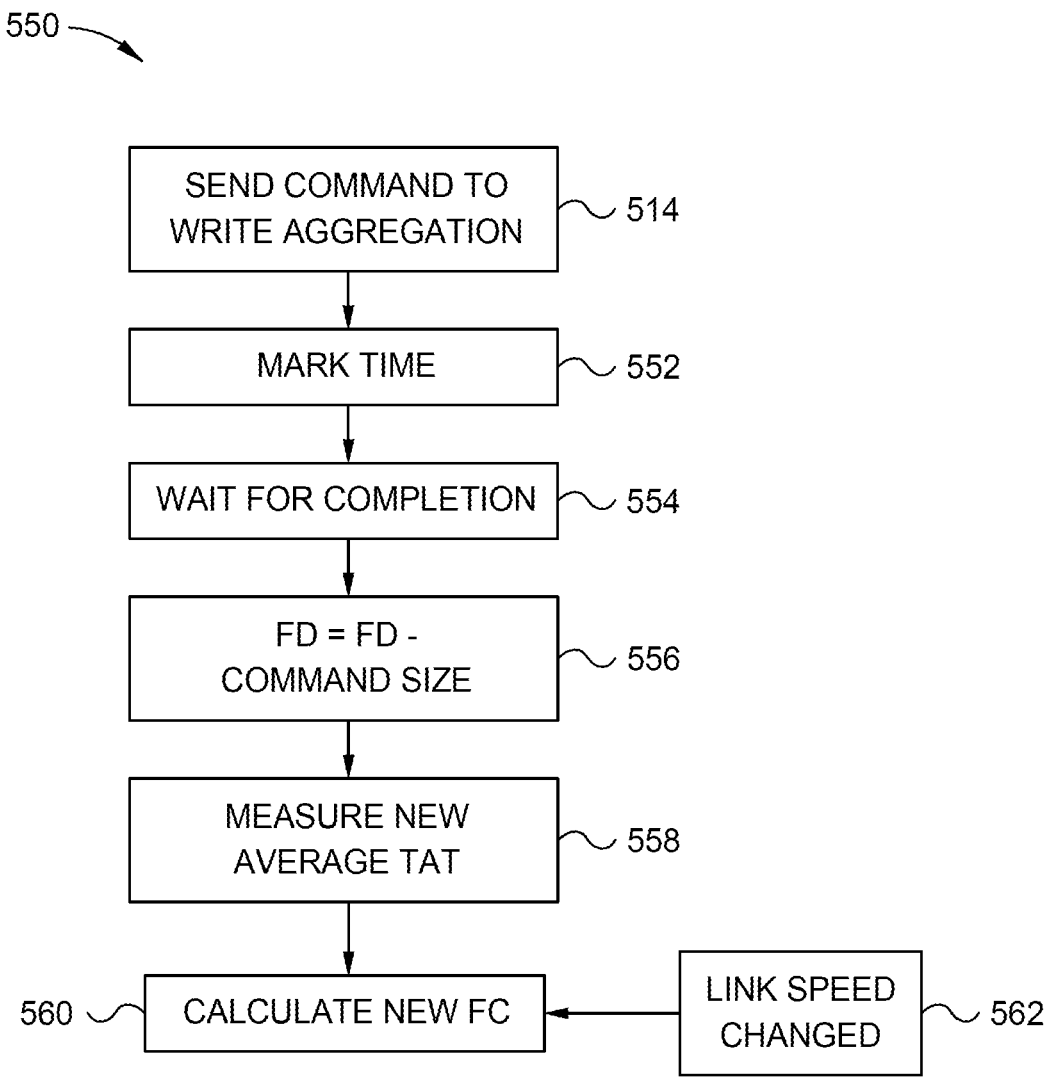
FIG. 5B is a flowchart illustrating write command aggregation.

FIG. 5B is a flowchart 550 illustrating write command aggregation. When the command is sent to write aggregation block at 514 (which may be referred to as a write aggregation block, unit or module), the time until the data is ready is measured by marking the time at 552 and then wait for the data to be read at 554. When the data is ready, FD is decreased by the command size at 556 and a new average TAT is calculated at 558 and a new FC is calculated at 560. Additionally, if the link ever goes down and the link speed changes at 562, the FC is recalculated at 560.

Figure 6:
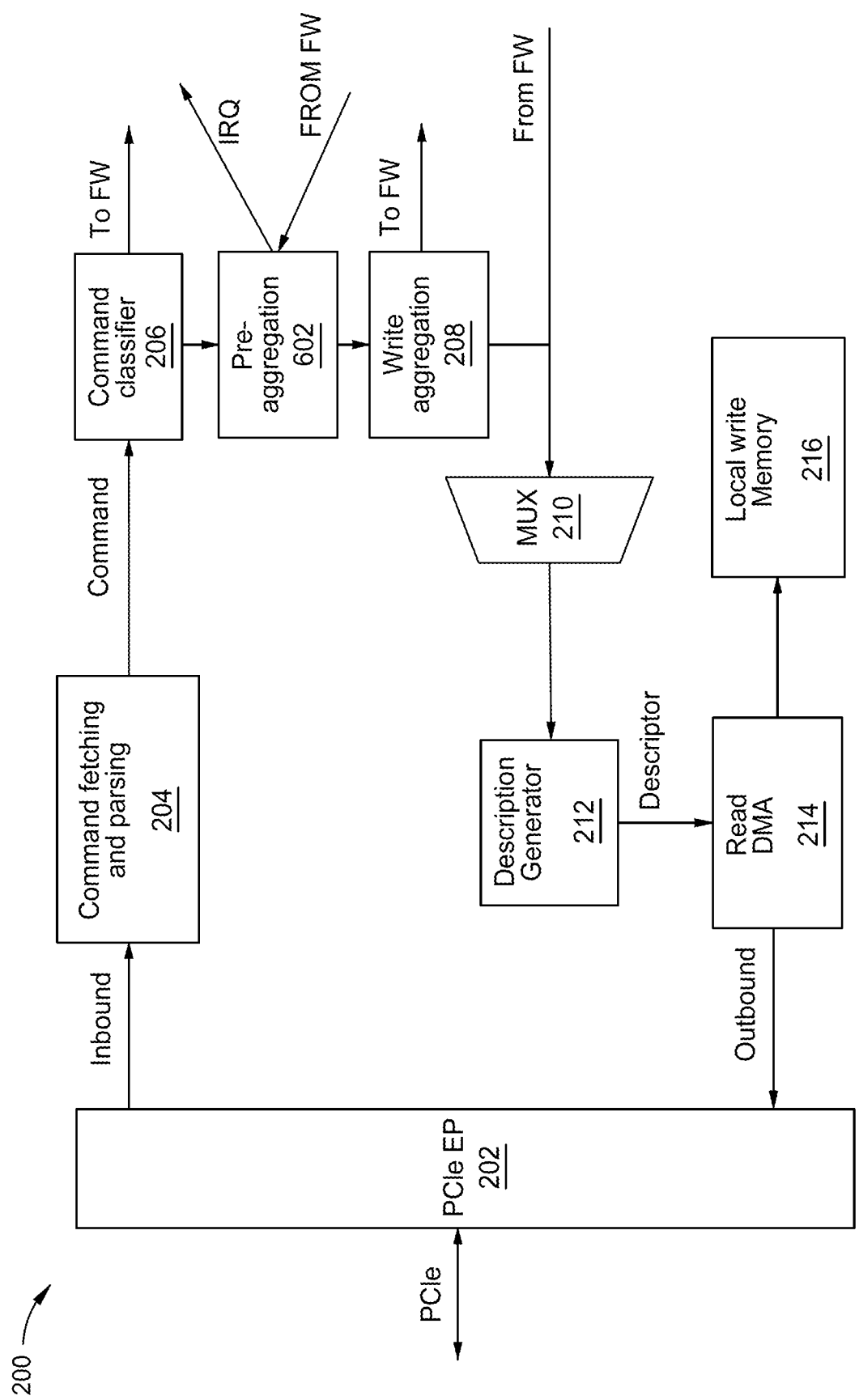
FIG. 6 is a schematic illustration of TLP packet handling according to one embodiment.

FIG. 6 is a schematic illustration of TLP packet handling according to one embodiment. FIG. 6 is identical to FIG. 2 except for the addition of a pre-aggregation module 602. The write commands are classified at the command classifier 206 and then sent to the pre-aggregation module 602 prior to being sent to the write aggregation module 208. The pre-aggregation module 602 performs the embodiments discussed herein of toggling between fetch before and fetch after modes to better shape the write execution by looking forward into the next write commands. More specifically, the pre-aggregation module 602 performs the process illustrated in FIG. 5A. The pre-aggregation module functions as a buffer to accumulate mis-aligned write commands to ensure data is ultimately written to the memory device in a manner that results in efficient read operations. An example of an efficient read operation is where the fifth command of FIG. 4 is entirely written to Die 1 and the third command is collected in the pre-aggregation module 602 to be written at a point in time after the aligned stream commands (i.e., first command, second command, fourth command, fifth command, sixth command, and seventh command). The third command would be written at a later time either alone after a predetermined period of time has passed or with other mis-aligned commands grouped together to collectively be aligned.

Figure 7:
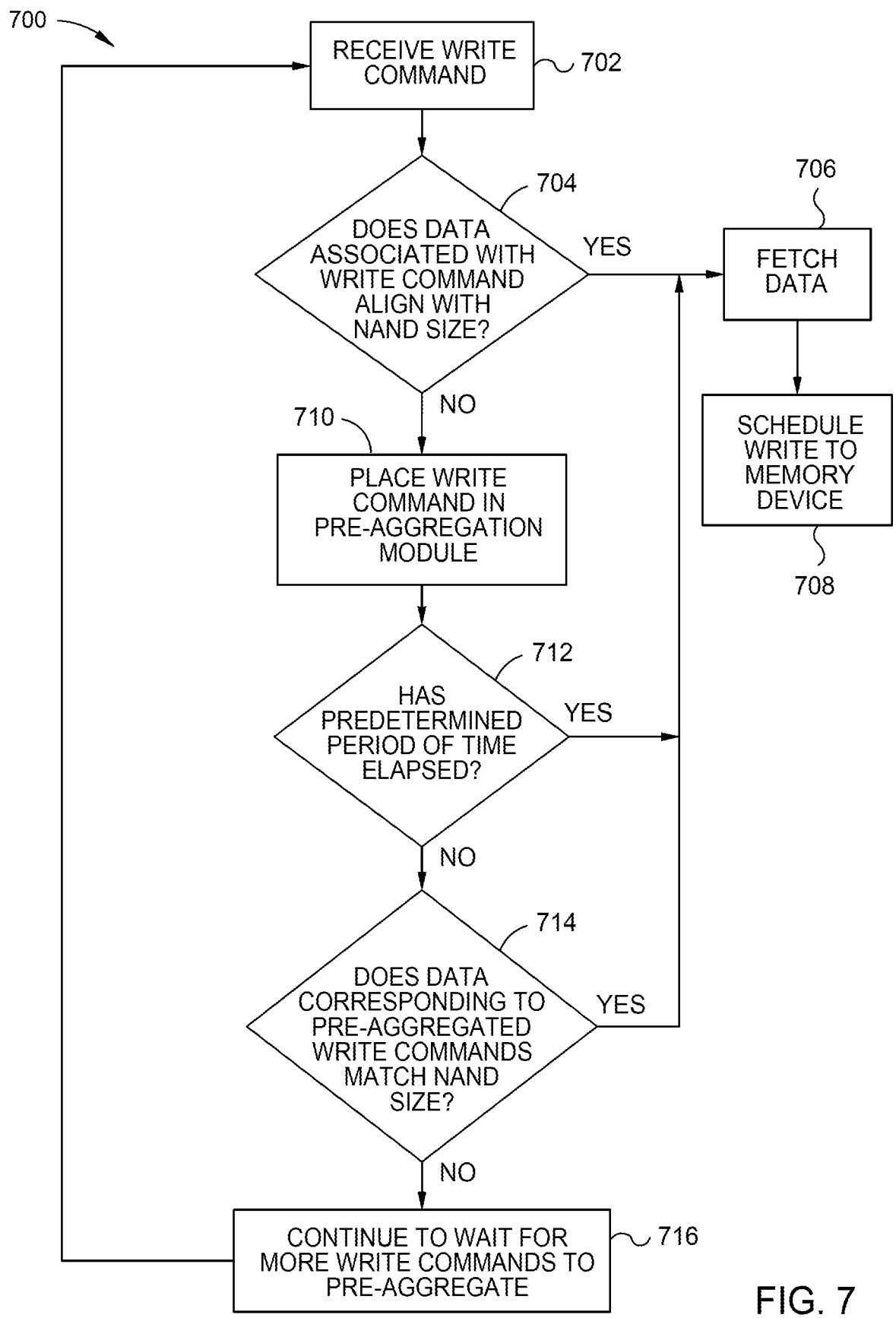
FIG. 7 is a flowchart illustrating write command processing according to one embodiment.

FIG. 7 is a flowchart 700 illustrating write command processing according to one embodiment. Initially, the controller receives a write command at 502. A determination is made, prior to retrieving the data associated with the write command, whether the data associated with the write command will be aligned with the memory device (e.g., NAND) size at 704. If the data will be aligned, then the data is fetched at 706 and writing the data to the memory device is scheduled at 708.

If the data associated with the write command will not be aligned with the memory device (e.g., NAND) size at 704, then the write command is placed in the pre-aggregation module at 706. Other write commands may already be present in the pre-aggregation module 706. A determination is made regarding whether a predetermined period of time has passed at 712. The predetermined period of time refers to the amount of time that one or more write command have been waiting in the pre-aggregation module to be processed. If the predetermined period of time has elapsed at 712, then the data is fetched at 706 and scheduled to be written to the memory device at 708.

If the predetermined period of time has not elapsed at 712, then a determination is made at 714 whether the data associated with the commands that are in the pre-aggregation module collectively are aligned with the memory device (e.g., NAND) size. If aligned, then the data can be fetched at 706 and scheduled to be written to the memory device at 708. If the data associated with the commands that are in the pre-aggregation module collectively are not aligned with the memory device (e.g., NAND) size, then the controller continues to wait for more write commands to pre-aggregate at 716 and the process begins again when the next write command is received at 702.

By utilizing a pre-aggregation buffer, the controller can better shape the order of write command execution by looking forward into the next write commands. In so doing, performance of the write commands can be shaped without impacting latency and bandwidth when the queue depth is lower. The pre-aggregation buffer does not significantly increase write buffer memory size.

In one embodiment, a data storage device comprises: a memory device; and a controller coupled to the memory device, wherein the controller is configured to: determine whether the controller is in a fetch first mode or a fetch after mode; determine whether a fetch depth (FD) is less than a flash memory unit (FMU) count (FC); and switch between the fetch first mode and the fetch after mode based upon the determining whether FD is less than FC. The controller is further configured to perform an initialization process, wherein the initialization process comprises: setting a mode to fetch first; and setting FD=0. A hysteresis (H) may be set=2, for example though other hysteresis are contemplated as well. The controller is further configured to: compute how many FMUs fit within a turn around time (TAT) and wherein the TAT is 1 µSec; and wait for a write command. The controller is configured to determine whether the controller is already in the fetch first mode or the fetch after mode. The controller determines that the controller is in the fetch after mode, the controller is further configured to: hold a write command in a pre-aggregation pool; and reorder and reclassify the write command. The controller is configured to determine whether FD is less than FC minus a hysteresis (H). Upon determining that FD is less than FC minus H, the controller is configured to change the mode to the fetch first mode. Upon determining that FD is not less than FC minus H, the controller is configured to wait for a write command. When the controller determines that the controller is in the fetch first mode, the controller is further configured to: send a write command to a write aggregation module; and set FD=FD+command size. The controller is further configured to determine whether FD is greater than FC plus a hysteresis (H). Upon determining that FD is greater than FC plus H, the controller is configured to change the mode to the fetch after mode. Upon determining that FD is not greater than FC plus H, the controller is configured to wait for a write command.

In another embodiment, a data storage device comprises: a memory device; and a controller coupled to the memory device, wherein the controller is configured to: determine that the controller is in a fetch first mode; send a write command to a write aggregation module; set fetch depth (FD) to be equal to FD minus command size; measure a new average turn-around time (TAT); calculate a new flash memory unit (FMU) count; and determine the fetch first mode should be changed to fetch after mode. The controller is configured to track the TAT and measure a time until data is ready to be written. The data is ready to be written when sufficient data has been accumulated to match a FMU size. The controller comprises a pre-aggregation module. The pre-aggregation module is configured to aggregate write commands for which data associated with the write commands individually do not match page size.

In another embodiment, a data storage device comprises: memory means; and a controller coupled to the memory means, wherein the controller is configured to: toggle between a fetch first mode and a fetch after mode based upon a relationship between fetch depth (FD) and flash management unit (FMU) count, wherein fetch first mode comprises fetching data up to a predetermined performance bandwidth and wherein fetch after mode comprises storing a write command in a pre-aggregation pool until sufficient commands associated with data are stored to meet the predetermined performance bandwidth. The controller is configured to store the write command in the pre-aggregation pool after fetching the command, parsing the command, and classifying the command. The toggling comprises switching to the fetch after mode when data associated with the write command that is fetched is greater than the predetermined performance bandwidth.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a memory device; and
 a controller coupled to the memory device, wherein the controller is configured to:
  determine whether the controller is in a fetch first mode or a fetch after mode;
  determine whether a fetch depth (FD) is less than a flash memory unit (FMU) count (FC); and
  switch between the fetch first mode and the fetch after mode based upon the determining whether FD is less than FC.

2. The data storage device of claim 1, wherein the controller is further configured to perform an initialization process, wherein the initialization process comprises:
 setting a mode to fetch first; and
 setting FD=0.

3. The data storage device of claim 2, wherein the controller is further configured to:
 compute how many FMUs fit within a turn around time (TAT) and wherein the TAT is 1 µSec; and
 wait for a write command.

4. The data storage device of claim 1, wherein the controller is configured to determine whether the controller is already in the fetch first mode or the fetch after mode.

5. The data storage device of claim 4, wherein when the controller determines that the controller is in the fetch after mode, the controller is further configured to:
 hold a write command in a pre-aggregation pool; and
 reorder and reclassify the write command.

6. The data storage device of claim 5, wherein the controller is configured to determine whether FD is less than FC minus a hysteresis (H).

7. The data storage device of claim 6, wherein upon determining that FD is less than FC minus H, the controller is configured to change the mode to the fetch first mode.

8. The data storage device of claim 6, wherein upon determining that FD is not less than FC minus H, the controller is configured to wait for a write command.

9. The data storage device of claim 4, wherein when the controller determines that the controller is in the fetch first mode, the controller is further configured to:
send a write command to a write aggregation module; and
set FD=FD+command size.

10. The data storage device of claim 9, wherein the controller is further configured to determine whether FD is greater than FC plus a hysteresis (H).

11. The data storage device of claim 10, wherein upon determining that FD is greater than FC plus H, the controller is configured to change the mode to the fetch after mode.

12. The data storage device of claim 10, wherein upon determining that FD is not greater than FC plus H, the controller is configured to wait for a write command.

13. A data storage device, comprising:
a memory device; and
a controller coupled to the memory device, wherein the controller is configured to:
determine that the controller is in a fetch first mode;
send a write command to a write aggregation module;
set fetch depth (FD) to be equal to FD minus command size;
measure a new average turn-around time (TAT);
calculate a new flash memory unit (FMU) count; and
determine the fetch first mode should be changed to fetch after mode.

14. The data storage device of claim 13, wherein the controller is configured to track the TAT and measure a time until data is ready to be written.

15. The data storage device of claim 14, wherein the data is ready to be written when sufficient data has been accumulated to match a FMU size.

16. The data storage device of claim 13, wherein the controller comprises a pre-aggregation module.

17. The data storage device of claim 16, wherein the pre-aggregation module is configured to aggregate write commands for which data associated with the write commands individually do not match page size.

18. A data storage device, comprising:
memory means; and
a controller coupled to the memory means, wherein the controller is configured to:
toggle between a fetch first mode and a fetch after mode based upon a relationship between fetch depth (FD) and flash management unit (FMU) count (FC), wherein fetch first mode comprises fetching data up to a predetermined performance bandwidth, wherein fetch after mode comprises storing a write command in a pre-aggregation pool until sufficient commands associated with data are stored to meet the predetermined performance bandwidth, and wherein the relationship between FD and FC is based on evaluating whether FD becomes less than FC minus hysteresis.

19. The data storage device of claim 18, wherein the controller is configured to store the write command in the pre-aggregation pool after fetching the command, parsing the command, and classifying the command.

20. The data storage device of claim 18, wherein the toggling comprises switching to the fetch after mode when data associated with the write command that is fetched is greater than the predetermined performance bandwidth.

* * * * *